Patented Nov. 7, 1939

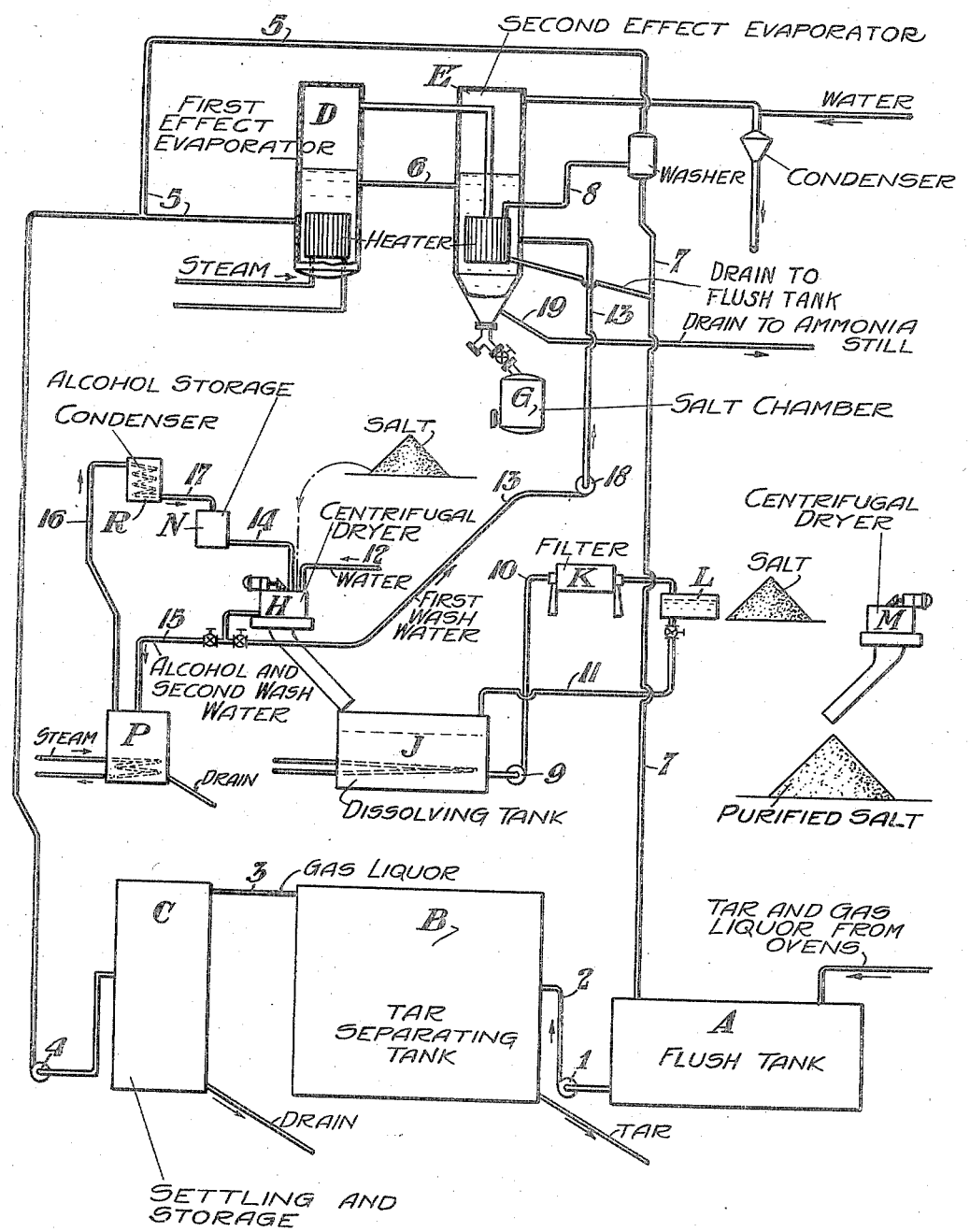

2,179,183

UNITED STATES PATENT OFFICE 2,179,183

METHOD OF RECOVERING SAL AMMONIAC FROM GAS LIQUOR

Charles H. Heimbach, Elyria, and Norman B. Thompson, Lorain, Ohio, assignors to National Tube Company, a corporation of New Jersey Application November 25, 1936, Serial No. 112,796

2 Claims. (Cl. 23—100)

In producing coke and by-products in by-product coke ovens, the moisture of the coal used passes over with the gas produced into the gas mains and other apparatus where it is condensed along with tar, etc., in all the processes generally used. When the moisture is condensed into liquid form it contains free ammonia gas dissolved in it, many compounds of ammonia, and also small amounts of other compounds, both organic and inorganic.

This condensate is variously called "gas liquor", "ammonia liquor" or "weak ammonia liquor". This liquor is generally recirculated through the mains conducting the gas from the ovens, either alone or mixed with tar, in order to flush out these mains and keep them clean, also in order to cool the gas. Ammonium chloride or sal ammoniac is formed during the chemical reactions which occur in coal distillation, and being readily soluble in water, the gas liquor contains a considerable quantity.

In the process of recovery of ammonia known as the "direct process", the gas, containing 80 or 85 per cent of the total ammonia produced, is passed through dilute sulphuric acid, recovering the ammonia as ammonium sulphate.

The gas liquor which condenses out before the gas is passed through the sulphuric acid may be concentrated by means of steam distillation, condensed, and sold as "crude concentrated ammonia liquor" or the vapor from the still may be passed through the sulphuric acid with the gas to make ammonium sulphate. In either case the sal ammoniac and other "fixed salts" of ammonia are decomposed by means of lime, the ammonia recovered and the calcium chloride, etc., produced in the decomposition of the fixed ammonia salts, wasted.

Several years ago it became desirable to produce more crude concentrated liquor than the usual practice would yield, and a method was devised to increase the amount of gas liquor which was covered by Patent No. 1,457,877, which issued to L. E. Doty on June 5, 1923. According to this patent, the gas liquor is separated into two parts, one part being distilled at once, the other part being recirculated through the gas mains as previously described. It has been found that in this method the fixed salts of ammonia including sal ammoniac build up in the part of the liquor which was recirculated until they reach quite a high concentration. As sal ammoniac sells for considerably more money than ammonium sulphate, it appeared feasible to recover the sal ammoniac rather than to decompose it with lime, as previously described. Recovery of the sal ammoniac from the ordinary gas liquor had been proved unprofitable on account of the small amount contained in it. However, several methods of concentration can be used. Also, the concentration may, as previously mentioned, be obtained by the process disclosed by the Doty Patent No. 1,457,877.

The recovery of the sal ammoniac from gas liquor containing 5 to 15 per cent, or more, presented several difficulties. In the first place sal ammoniac is extremely corrosive and attacks most metals, and even glass. Second, other salts of ammonia, as well as a large number of other compounds, existed in the liquor and had to be eliminated before the sal ammoniac could be produced in salable form. Third, the evaporation of this liquor, in order to produce the salt, is accompanied by excessive foaming, which carries off much of the salt, decreasing the yield.

In the process of recovery now to be disclosed the liquor, after settling to allow as much of the impurities to settle out as possible, is pumped to a double effect evaporator of standard design. This evaporator is fabricated from 18–8 alloy steel, which is found to be sufficiently resistant to corrosion. Such steel includes 18 per cent chromium and 8 per cent nickel.

In a double effect evaporator, the first effect consists of a chamber, partially filled with the liquor to be evaporated. In this liquor is immersed a steam coil heater, and the liquor is circulated around the heater in the manner of a coffee percolator. As the liquor in the first effect is concentrated, the vapor from it passes over to the heater of the second effect, where it is condensed and gives up its heat. Partly concentrated liquor from the first effect flows to the chamber of the second effect, where it is evaporated down by the vapor from the first effect until salt (sal ammoniac) is produced. If the liquor in the first effect foams and carries off any sal ammoniac with the foam, it is carried over to the second effect heater, condensed there with the vapor, and returned to the gas liquor. This, it will be noted, prevents losses from foaming. In order to use all the heat possible in the evaporator, the vapor from the second effect is piped to a jet condenser so that the chamber of the second effect is under vacuum. The vapor and condenser water are wasted to the sewer, and the evaporator delivers crystallized salt.

Some ammonia gas is dissolved in the gas liquor, and more is produced by decomposition by heat of some of the ammonia products in it. This ammonia is recovered by venting the heater of the second effect to a washer. The vapors were originally washed with water but it was found that combination of the chemicals produced solids which plugged up the washer, so gas liquor is used for washing, and returned to the original liquor. A certain amount of impurities come down with the salt from the evaporator. Others remain in the liquor in the chamber of the second effect and in time concentrate until they interfere with production. Therefore, when concentration of these impurities reaches a certain point, the liquor in the second effect is discharged to the ammonia still, and is wasted so far as this process is concerned. The salt (sal ammoniac) crystallized out in the evaporator, is purified and dried by steam in a salt chamber in an established and usual manner, and is then transferred to a centrifugal drier of conventional type except that it is constructed of corrosion-resistant metal.

The sal ammoniac produced at this point is satisfactory for some purposes, and experimenters with other processes have reached this point without serious difficulty, although not in the same manner. The normal process of purification from this point on would be to wash the salt, centrifuge, re-dissolve in water, filter, recrystallize, and obtain pure salt. However, when this was done, although the salt was practically pure by analysis, it would not produce results in sheet galvanizing. It was found, after much investigation, that the trouble was caused by minute amounts of substances which may be described as "ammonia salts of certain organic acids".

Part of these salts were soluble in water, and therefore could not be filtered out, but upon heating the salt their composition was changed, and black, sticky substances were formed, which stuck to the sheets in the galvanizing process and interfered with the operation, it being remembered that sal ammoniac is used as a flux when steel is dipped in molten spelter in this process. As there are hundreds of these compounds, no effort was made to determine just what ones were present, but it was found that they could be practically eliminated by washing the salt with ethyl alcohol. Accordingly, the salt from the evaporator is placed in the centrifugal dryer, washed with water, then with ethyl alcohol, then with water again to remove the alcohol, dried, re-dissolved, a saturated solution formed at about 80 degrees centigrade, the solution filtered and allowed to cool, the mother liquor drained off and used to dissolve more salt, and the crystals centrifuged, washed with water, and dried.

It was found that the small amount of water-soluble impurities remaining in the salt after the alcohol wash and dissolved with the salt when it was re-dissolved were made insoluble when the solution was heated, and could be filtered out. For this reason, the impurities did not build up in the solution or in the finally purified salt, so that the same solution could be used again and again to crystallize out fresh charges of salt.

It was found that washing the salt once with alcohol, and then wasting the alcohol, involved prohibitive expense, so the alcohol used in washing the salt, together with the alcohol and water mixture from the second water wash, were led to a small still, where the alcohol was distilled off by means of a steam coil, condensed, and re-used, leaving the impurities it washed out of the salt as a residue in the still.

Even with the use of the still to recover the alcohol, when alcohol of ordinary strength was used for washing the losses were still too high, so the water of the second wash was distilled off with the alcohol, giving an alcohol solution of about 50 per cent water and 50 per cent alcohol, which was used for the alcohol wash. Only then were the alcohol losses brought down to a point where the alcohol washing was commercially practical. Other solvents could be used instead of ethyl alcohol, but it is the most suitable under many circumstances.

The accompanying drawing is a diagram of suitable apparatus for carrying out the process just described.

A mixture of tar and gas liquor building up in a flush tank A is pumped by a pump 1 through a pipe 2 to a tar separation tank B. Gas liquor flows through a pipe 3 to a settling and storage tank C and is pumped by a pump 4 through a pipe 5 to a first effect evaporator D, and flows through a pipe 6 to a second effect evaporator E. Vapor from the liquor in the first effect evaporator goes to the second effect heater, is condensed, and flows through a pipe 7 to the flush tank A. Vapors from a vent in the second effect heater pass through a pipe 8 to a washer F where they are washed by gas liquor from the pipe 5 and returned to the flush tank A through the pipe 7.

Sal ammoniac crystallized in the second effect evaporator E is purified and dried by steam in a salt chamber G and, when discharged from this chamber, is loaded in a centrifugal dryer H. After being washed and dried as described further on, it passes through a chute to a dissolving tank J where it is dissolved and heated. The solution is pumped by a pump 9 through a pipe 10, through a filter K to a cooling pan L. After the salt is crystallized out in the pan L, solution is drained back through a pipe 11 to the dissolving tank J, and the crystallized salt is dried and washed with water in a centrifugal dryer M, and is then ready for sale.

The salt in the centrifugal dryer H is washed with water through a pipe 12. Water leaves the dryer through a pipe 13 and is pumped by a pump 18 to the second effect evaporator E. Alcohol is stored in a tank N and the salt in the centrifugal dryer H is washed with it through a hose 14. It then flows through a pipe 15 to an alcohol still P. A second water wash from the pipe 12 also passes through the pipe 15 to the still P. Alcohol vapor is distilled off through a pipe 16, condensed in a condenser R and flows through a pipe 17 to the storage tank N.

A drain pipe 19 is provided for the second effect evaporator E so that when impurities in the liquor are concentrated to a certain point, the liquor can be drained off to the ammonia still and the sal ammoniac contained in it recovered as ammonium sulphate or concentrated crude ammonia liquor.

We claim:

1. A process for recovering ammonium chloride from coke oven gas liquor containing ammonium chloride and free ammonia, said process including passing said liquor through a multiple-effect evaporator so that the vapor driven from the liquor in the first effect is carried into the heater of the second effect and condensed, and so that foam forming in the first effect and containing ammonium chloride is carried over into the heater of the second effect with the vapor and there condensed with the latter, the condensate from said heater being repassed through said evaporator to effect recovery of the ammonium chloride initially lost in the first effect by formation of said foam.

2. A process for recovering ammonium chloride from coke oven gas liquor containing ammonium chloride and free ammonia, said process including passing said liquor through a multiple-effect evaporator so that the vapor driven from the liquor in the first effect is carried into the heater of the second effect and condensed, and so that foam forming in the first effect and containing ammonium chloride is carried over into the heater of the second effect with the vapor and there condensed with the latter, the condensate from said heater being repassed through said evaporator to effect recovery of the ammonium chloride initially lost in the first effect by formation of said foam and said heater being vented to remove ammonia gas separating therein from said liquor, said gas being subsequently redissolved in said liquor so as to be repassed through said evaporator whereby to permit a closed circulating system, portions of the liquor in said second effect being removed as required to keep the concentration of impurities in said system sufficiently low to prevent their interfering with the operation of said process.

CHARLES H. HEIMBACH.
NORMAN B. THOMPSON.